United States Patent [19]

Desitter et al.

[11] 3,927,231
[45] Dec. 16, 1975

[54] FLAMEPROOFING OF LINEAR POLYESTERS

[75] Inventors: Gerard Desitter, Ternay; Gilbert Vivant, Lyon, both of France

[73] Assignee: Rhone-Poulenc S.A., Paris, France

[22] Filed: Feb. 25, 1974

[21] Appl. No.: 445,546

[30] Foreign Application Priority Data
Feb. 28, 1973 France .................. 73.07092

[52] U.S. Cl. ............ 427/390; 260/2 P; 260/75 P; 260/860; 428/480; 428/920
[51] Int. Cl.[2] ................... C08J 7/02; C08L 67/00
[58] Field of Search ............ 260/860, 75 P; 117/138.8 F

[56] References Cited
UNITED STATES PATENTS

| | | | |
|---|---|---|---|
| 3,053,795 | 9/1962 | Coover | 260/860 |
| 3,158,642 | 11/1964 | Chapin | 260/860 |
| 3,326,852 | 6/1967 | Thomas | 260/860 |
| 3,367,996 | 2/1968 | Strauss | 260/860 |
| 3,442,982 | 5/1969 | Friedman | 260/860 |
| 3,491,061 | 1/1970 | Millich | 260/30.8 DS |
| 3,567,799 | 3/1971 | Prevorsek | 260/860 |
| 3,664,974 | 5/1972 | Cohen | 260/860 |
| 3,719,727 | 3/1973 | Masai | 260/860 |
| 3,830,771 | 8/1974 | Cohen | 260/860 |

FOREIGN PATENTS OR APPLICATIONS

| | | | |
|---|---|---|---|
| 2,253,207 | 5/1973 | Germany | 260/860 |

*Primary Examiner*—Paul Lieberman
*Attorney, Agent, or Firm*—Cushman, Darby & Cushman

[57] ABSTRACT

Flameproofing of linear polyesters of the general formula:

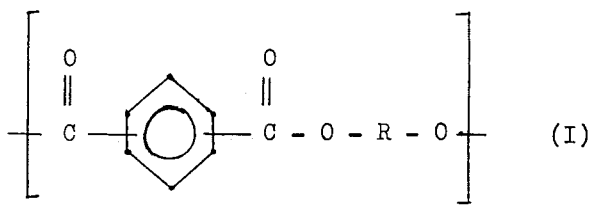

in which R represents a linear or branched alkylene group containing 2 to 6 carbon atoms, provided by the addition of 0.5 to 40 % by weight, based on the weight of the polyester, of at least one polyphosphonate posseding a plurality of units of the general formula:

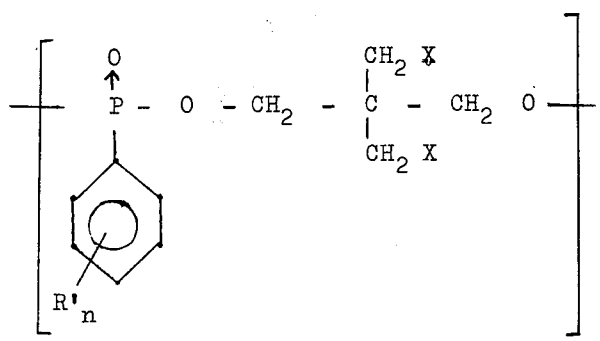

in which R' represents a hydrogen atom, a halogen atom or an alkyl radical containing 1 to 4 carbon atoms optionally substituted by one or more halogen atoms, $n$ represents an integer from 1 to 3 and X represents a chlorine or bromine atom.

11 Claims, No Drawings

FLAMEPROOFING OF LINEAR POLYESTERS

This invention relates to flameproofed compositions based on linear polyesters and to a process for producing them.

The expression "flameproof compositions" as used herein denotes materials which, after they have been set alight and then removed from the source of combustion, are incapable of supporting a flame sufficient for complete combustion.

It is known that linear polyesters derived from benzene-dicarboxylic acids and from aliphatic glycols such as polyethylene glycol terephthalate, are materials of great industrial importance because they have a variety of uses both in the textile industry and for the manufacture of films and sheets for diverse purposes. These compounds however possess the disadvantage of supporting flame, especially in the molten state. Thus it is well known that a linear polyester fibre, brought into contact with a flame, melts to form drops which burn very readily and which, because of this, can propagate fire very easily, for example by falling onto combustible materials. It is thus particularly important for numerous applications, especially in the textile field such as fabrics for furnishings and clothing, to be able to make use of linear polyesters which are fire-resistant. Moreover, it is also necessary to change the behaviour of these polyesters on melting, when the polyesters are subjected to heat, in particular to a flame. In fact, drops of molten polymer heated to a high temperature can propagate or facilitate the spread of fire even if they are not set alight. It is thus important for those skilled in the art to have at their disposal an adjuvant which, after it has been incorporated into a linear polyester, can simultaneously improve the fire-resistance of the latter and reduce its tendency to form drops on heating, without however changing its chemical, mechanical and physical properties too profoundly. Numerous adjuvants have been proposed which make it possible to improve the fire-resistance of linear polyesters, either by incorporation during polycondensation or by incorporation into the molten polycondensate or into the polycondensate after shaping. Hitherto, no compound has proved to be wholly satisfactory.

A process for flameproofing linear polyesters possessing a plurality of units of the general formula:

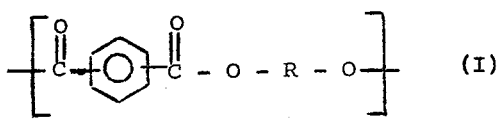

in which R represents a linear or branched alkylene radical containing 2 to 6 carbon atoms, has now been found according to the present invention; this process is characterised in that there are incorporated into these polyesters 0.5 to 40% by weight, preferably 2 to 20% by weight, based on the weight of the polyester, of a polyphosphonate possessing a plurality of units of the general formula:

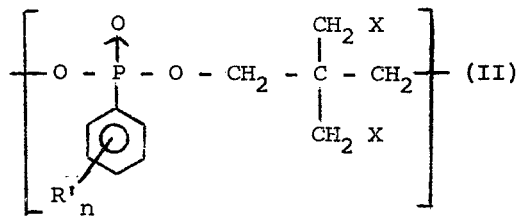

in which R' represents a hydrogen atom, a halogen atom (chlorine, fluorine or bromine) or an alkyl radical containing 1 to 4 carbon atoms, for example, methyl, ethyl or propyl, optionally substituted by one or more halogen atoms such as chlorine or bromine; n represents an integer from 1 to 3 and X a chlorine or bromine atom.

It has been found that, in addition to their excellent capacity for flameproofing polyesters, the polyphosphonates of formula (II) possess the property of reducing the tendency of the polyesters to form drops when they are subjected to intense heat, and especially to a flame. Furthermore, because of their polymeric nature, the polyphosphonates of the formula (II) do not possess the disadvantages of non-polymeric adjuvants, such as the tendency to crystallise, to sweat or to volatilise, which manifest themselves by rapid removal of the adjuvant with consequent loss of fire-resistance. The advantageous changes in the behaviour of linear polyesters with respect to combustion as a result of incorporating 2,2-bis-(halogenomethyl)-propane-1,3-diol polyphosphonates could not have been predicted because it is well known that in the flameproofing field the flameproofing effect is not always retained when a given adjuvant is replaced by a homologue, or for one and the same adjuvant, when one substance to be flameproofed is replaced by another (see H. VOGEL, "Flammfestmachen Von Kunststoffen" 1966, page 23).

The polyphosphonates of formula (II) can be produced by various known processes. These methods have been described in "Reviews in Macromolecular Chemistry", G. B. BUTLER and K. F. O'DRISCOLL) Volume 2, page 109 et seq. A preferred process consists of reacting substantially equimolar amounts of an arylphosphonyl dihalide and 2,2-bis-(halogenomethyl)-propane-1,3-diol. This reaction can be carried out in bulk, optionally in the presence of catalytic amounts of metal salts such as MgCl$_2$, ZnCl$_2$ or CaCl$_2$, at a temperature of between 100° and 300°C, or in solution in organic solvents such as benzene, optionally in the presence of a stoichiometric amount of a hydracid acceptor such as a tertiary base, for example pyridine. The procedure involving polycondensation of an arylphosphonyl dihalide with a 2,2-bis-(halogenomethyl)-propane-1,3-diol at the interface of two solvents for the reagents, which are not miscible with one another, and in the presence of a hydracid acceptor, in accordance with the process described in U.S. Pat. No. 3,491,061, is also possible. According to another process, the polyphosphonates of formula (II) can be prepared by reacting the halogenated glycol with a lower alkyl ester of an arylphosphonic acid, especially the dimethyl or diethyl ester, preferably continuously removing the lower alkanol resulting from the transesterification.

As arylphosphonyl halides which can be used to prepare the polyphosphonates of formula (II), there may be mentioned by way of example: phenylphosphonyl dichloride, phenylphosphonyl dibromide, p-tolylphosphonyl dichloride, p-tolylphosphonyl dibromide, p-chlorophenyl-phosphonyl dichloride, m-chlorophenyl-phosphonyl dibromide and p-bromophenylphosphonyl dibromide. Amongst these compounds, phenylphosphonyl dichloride is particularly suitable.

2,2-Bis-(chloromethyl)-propane-1,3-diol or 2,2-bis-(bromomethyl)-propane-1,3-diol can be used equally well for the preparation of the polyphosphonates of formula (II).

Regardless of the process by which they are produced, 2,2-bis-(halogenomethyl)-propane-1,3-diol polyphosphonates take the form of brown-coloured powders. They are soluble in solvents such as dimethylformamide, dimethylacetamide, dimethylsulphoxide and alcohols, for example methanol.

Amongst the 2,2-bis-(halomethyl)-propane-1,3-diol polyarylphosphonates which can be employed for flame-proofing linear polyesters, 2,2-bis-(bromomethyl)-propane-1,3-diol polyphenylphosphonate is preferred.

The molecular weight of the polyphosphonates of formula (II) is not critical for the flameproofing. It is however preferred to use a polyphosphonate of specific viscosity greater than 0.10 measured as a 1% by weight solution in dimethylformamide.

As linear polyesters of formula (I) which can be flameproofed by means of the 2,2-bis-(halomethyl)-propane-1,3-diol polyarylphosphonates, there may be mentioned those prepared from dicarboxylic acids such as orthophthalic, isophthalic and terephthalic acids or mixtures thereof and from glycols such as ethylene glycol, propane-1,2-diol, propane-1,3-diol, neopentyl glycol, butane-1,4-diol and hexane-1,6-diol. The polyarylphosphonates of formula (II) are particularly suitable for flameproofing polyethylene glycol terephthalate or copolyesters containing a preponderant proportion of units derived from terephthalic acid and ethylene glycol, and more particularly at least 80% of the said units.

The polyphosphonates of formula (II) can be incorporated into the linear polyesters by the usual methods. For example, the polymers can simply be mixed together, in the solid state, or the adjuvant can be introduced into the molten polyester during its processing, for example, at any stage whatsoever of the extrusion process of the molten polyester. It is also possible to deposit the flameproofing agent on finished products, using solutions or suspensions in water or organic solvents, in a variety of ways. This latter method is particularly suitable for flameproofing textile articles such as fibres, yarns, woven fabrics and knitted fabrics based on polyesters. It then suffices to impregnate the articles, preferably by means of a flameproofing solution in an organic solvent, and then to evaporate the latter. Volatile solvents are preferably employed as the solvent; lower aliphatic alcohols such as methanol or ethanol are preferably used. The concentration of the flameproofing solution is not critical and can vary within wide limits. For obvious reasons of convenience, it is however preferable to employ solutions which are as concentrated as possible.

It is also possible to introduce the flameproofing compound at any stage whatsoever in the preparation of the polyester, for example during the transesterification of methyl terephthalate with a glycol, or during the polymerization.

The textile fibres which are produced by flameproofing the polyterephthalates with the polyphosphonates of formula (II), such as those produced by depositing the flameproofing agent from a solution, can be subjected, without disadvantage, to conventional treatments, especially heat treatments.

The following Examples further illustrate the present invention. The flame-resistance was determined using a polyester in the form of a tubular knitted fabric, by measuring the limiting oxygen index according to ASTM Standard Specification D-2863-70; by measuring the length of burnt sample according to ATCC Standard Specification Test Method 34-1969 (variant for thermoplastic fibres providing for the incorporation of glass fibres into the sample); and finally by determining the behaviour of the sample with respect to the formation of burning drops by means of the test using the epiradiator proposed by French legislation (See decree of 9th Dec. 1957, Official Register of 16th Jan. 1958, modified by the decree of 10th July 1965, Official Register of 23rd July 1965) relating to tests for fusible materials.

EXAMPLE 1

A. Preparation of 2,2-bis-(bromomethyl)-propane-1,3-diol polyphenylphosphonate.

157.2 g. (0.6 mol) of 2,2-bis-(bromomethyl)-propane-1,3-diol are introduced into a 1,000 cm³ cylindrical glass reactor, equipped with a stirring system, a heating device, a dropping funnel and a tube for removing the gaseous reagents, and the diol is melted by heating at 100°C. 117 g. of phenylphosphonyl dichloride (0.6 mol) are then added dropwise with stirring over 1 hour. As soon as the addition is complete the temperature is raised gradually to 225°C and is maintained at this temperature for 2 hours, after which it is brought back to 70°C in order to empty the contents of the flask onto a stainless steel plate; the product obtained is then left to cool to ambient temperature.

The composition of this product corresponds to that of a polymer consisting essentially of recurring units of the formula:

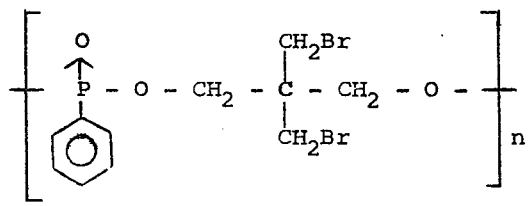

This polymer has a softening point of 60°C and a specific viscosity of 0.2, measured at 25°C as a 1% by weight solution in dimethylformamide. It is soluble in dimethylformamide, dimethylacetamide, dimethylsulphoxide, N-methylpyrrolidone and methanol.

The infra-red spectrum of this product has absorption bands at 1,440, 1,250 and 1,050 cm$^{-1}$, characteristic respectively of P—C$_6$H$_5$, P → O and P—O—C bonds.

B. Flameproofing.

A tubular knitted fabric weighing 129 g. per square meter isi prepared from polyethylene glycol terephthalate yarns of 200 decitex/88 strands, and is impregnated by immersing it for 2 minutes in a solution containing 10 g. of the polyphenylphosphonate obtained above in 100 cm$^3$ of methanol.

The sample is then squeezed out between the rollers of a laboratory mangle and dried at 80°C for 2 minutes. The squeezing is controlled so as to produce varying polyphenylphosphonate contents for various samples. These contents are determined by weighing the sample before immersion and then after drying, and are expressed in % by weight of polyphosphonates relative to the untreated sample.

In order to determine the limiting oxygen index (L.O.I.), the test-piece-holder proposed by ASTM Standard Specification D 2863-70 for small plates was replaced by a rectangular frame open at the top, of internal dimensions 5 × 16 cm, to which the tubular knitted fabrics can be fixed.

The values for the limiting oxygen index as a function of the polyphenylphosphonate content are given in the following table:

| Polyphosphonate % by weight | Phosphorus % by weight | Bromine % by weight | L.O.I. |
|---|---|---|---|
| 0 | | | 23–25 |
| 5 | 0.4 | 2.08 | 29 |
| 15 | 1.21 | 6.24 | 36 |
| 20 | 1.61 | 8.33 | 39.5 |
| 25 | 2.01 | 10.41 | 41 |

It can be seen that with a 2,2-bis-(bromomethyl)-propane-1,3-diol polyphenylphosphonate content of 5% by weight (corresponding to a phosphorus content of 0.4% and a bromine content of 2.08% relative to the original weight of the sample), the L.O.I. index reaches a value of 29, which is generally considered as very good and adequate.

EXAMPLE 2

Following the procedure of Example 1, a series of samples with varying polyphosphonate content are prepared and subjected to a heat treatment lasting 30 seconds at 210°C. The test pieces thus obtained are then subjected to the ATCC Test 34-1969. The results given in the following table were obtained:

| Polyphosphonate % by weight | Phosphorus % by weight | Bromine % by weight | Height destroyed | % of sample destroyed |
|---|---|---|---|---|
| 0 | | | 26 | 100 |
| 6.3 | 0.5 | 2.62 | 8.5 | 33 |
| 9.7 | 0.78 | 4.04 | 8.5 | 33 |

It can be seen that a small amount of polyphenylphosphonate is sufficient to provide a considerable improvement in the fire-resistance.

EXAMPLE 3

Samples with varying polyphenylphosphonate contents were prepared as in Example 2 and were subjected to the test using the epi-radiator, which consists of subjecting the sample, placed on a support formed by two superposed metal rings of the same diameter, between which there is placed a gauze of metal wires of diameter 0.05 cm comprising two meshes to the centimeter, to the effect of a radiator placed 3 cm from the upper face of the test piece.

A receptacle for drops, consisting of a cylindrical tank lined with cellulose wadding, is placed 30 cm below the test-piece-holder. Under these conditions, the cellulose wadding never becomes ignited, in the case of samples with polyphenylphosphonate contents of 6.3% and 9.3% by weight. This result is due both to the flameproofing effect of the adjuvant and to the change in the capacity of the polyester to form drops. In fact, it is found that the formation of drops is considerably restricted by the presence of the adjuvant.

We claim:
1. A flameproof composition which comprises at least one linear polyester possessing a plurality of units of the general formula:

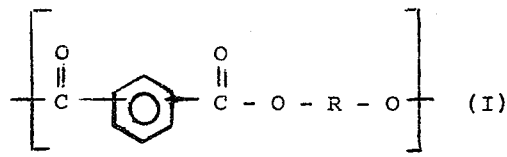

in which R represents a linear or branched alkylene group containing 2 to 6 carbon atoms, and 0.5 to 40% by weight, based on the weight of the polyester, of at least one polyphosphonate possessing a plurality of units of the general formula:

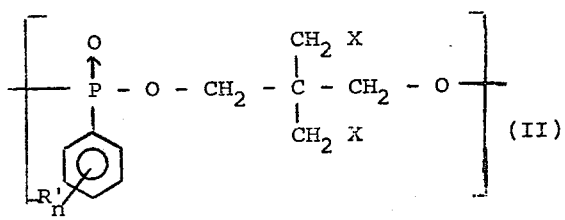

in which R' represents a hydrogen atom, a halogen atom or an alkyl radical containing 1 to 4 carbon atoms optionally substituted by one or more halogen atoms, $n$ represents an integer from 1 to 3 and X represents a chlorine or bromine atom.

2. A composition according to claim 1, in which the polyphosphonate is 2,2-bis-(bromomethyl)-propane-1,3-diol polyphenylphosphonate.

3. A composition according to claim 1, in which the linear polyester is polyethylene glycol terephthalate or a copolyester containing at least 80% of polyethylene glycol terephthalate units.

4. A composition according to claim 1 which contains 2 to 20% by weight, based on the weight of the polyester, of the polyphosphonate.

5. A composition according to claim 1, in which the polyphosphonate has a specific viscosity greater than 0.10, measured as 1% by weight solution in dimethylformamide.

6. A composition according to claim 1, which is in the form of a fibre, yarn, woven fabric or knitted fabric.

7. Process for the preparation of a composition as defined in claim 1, which comprises incorporating into the linear polyester either during or after its production or applying to the surface thereof 0.5 to 40% by weight, based on the weight of the polyester, of the polyphosphonate.

8. Process according to claim 7, in which the linear polyester is impregnated with a solution of 2,2-bis-(halomethyl)-propane-1,3-diol polyarylphosphonate in an organic solvent, and the solvent is evaporated.

9. Process according to claim 8, in which the 2,2-bis-(halomethyl)-propane-1,3-diol polyarylphosphonate is dissolved in a lower alkanol.

10. Process according to claim 9, in which the lower alkanol is methanol.

11. Process according to claim 7, in which the linear polyester is in the form of a textile article.

* * * * *